April 4, 1967     A. E. TRAVER     3,312,102
AUTOMATED ENGINE FOR DETERMINING THE COMBUSTION QUALITY OF A FUEL
Filed Dec. 18, 1961     4 Sheets-Sheet 1
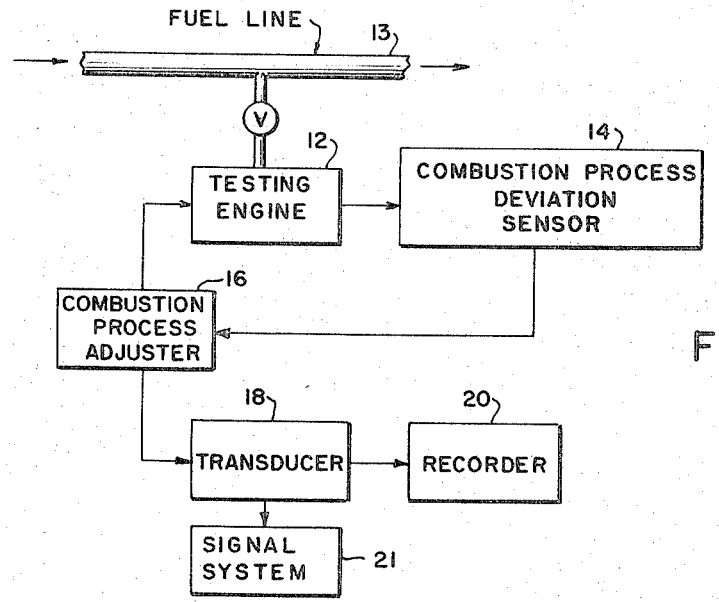
FIG. 1
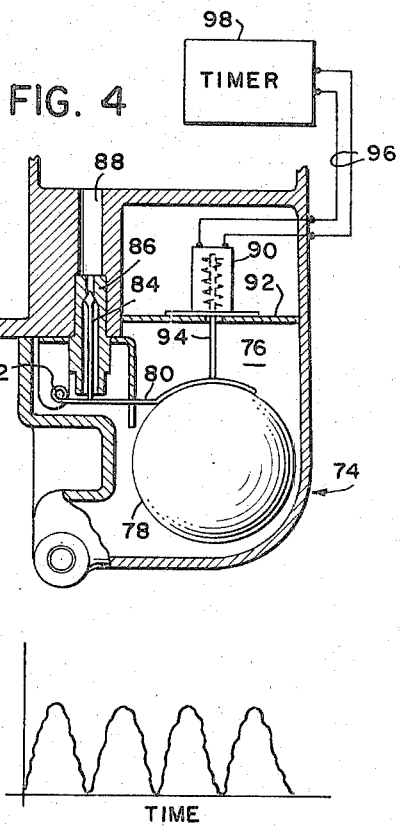
FIG. 4
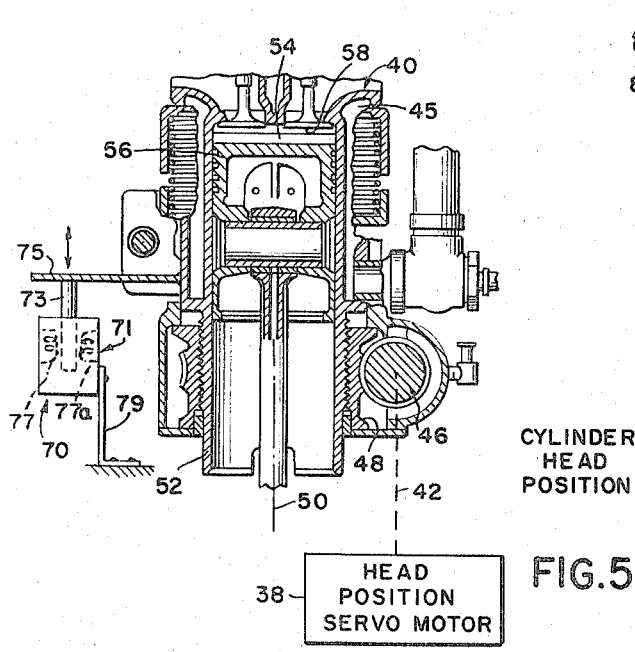
FIG. 3
FIG. 5
INVENTOR.
ALFRED E. TRAVER
BY Oswald G. Hayes
ATTORNEY

INVENTOR.
ALFRED E. TRAVER
BY
ATTORNEY

INVENTOR.
ALFRED E. TRAVER
BY
ATTORNEY

INVENTOR.
ALFRED E. TRAVER
BY Oswald G. Hayes
ATTORNEY

United States Patent Office 3,312,102
Patented Apr. 4, 1967

3,312,102
AUTOMATED ENGINE FOR DETERMINING THE COMBUSTION QUALITY OF A FUEL
Alfred E. Traver, Great Neck, N.Y., assignor to Mobil Oil Corporation, a corporation of New York
Filed Dec. 18, 1961, Ser. No. 160,052
12 Claims. (Cl. 73—35)

This invention relates to the determination of the combustion quality of a fuel for internal combustion engines and, more particularly, to means for determining the combustion quality of such a fuel more quickly and to a higher degree of accuracy than has been possible heretofore.

With the recent developments in automotive engines and in automotive engine fuels, testing procedures for determining the combustion qualities of such fuels have become all important. According to a standard method which has been adopted by the American Society for Testing Materials under ASTM Designation D908, for example, the detonating or "knocking" quality of a gasoline, i.e., the propensity of the gasoline to "knock" or to experience rapid combustion of its unburned end gases in the firing chamber of an engine cylinder, commonly termed autoignition, is determined in terms of an octane number by actual test in a standard engine operated under standard conditions. Briefly, with the engine powered by the test gasoline, the compression ratio is varied by manual adjustment of an adjustable cylinder head until a standard knock or detonation intensity is obtained, which is determined visually by observing a knock meter. Reference gasoline blends are then run under exactly the same conditions and the same compression ratio, and their knock intensities are noted. The octane number of the test sample is then determined by interpolation between the intensity readings of two reference gasolines whose knock intensities bracket that of the test sample.

While the foregoing standard test method has been widely used for years, it leaves much to be desired, particularly with gasolines having octane numbers of 100 or greater. For one thing, test precision is poor, and variations in the test results obtained in practice are likely to be of the order of ±1 octane number. To maintain a specified octane number for a gasoline, therefore, it is a common refining practice to resort to the inefficient and costly expedient of setting refining conditions to produce a gasoline having an octane number that is between ⅓ and 1 octane number higher than the specified number. Secondly, the test procedure is slow and time consuming so that only periodic spot checks of the octane rating of a gasoline are feasible. As a result, a temporary drop in the octane rating of the gasoline below the specified value may go undetected, or it may not be detected until after a substantial quantity of gasoline not meeting the specifications has been produced.

Considerable improvement in test precision has been achieved by a modified method in which the engine compression ratio is adjusted for the test gasoline as well as the reference gasolines to cause knocking or detonation to occur at a predetermined time after the engine piston reaches its top dead center position measured in degrees of engine crankshaft rotation. With this method, which is described in detail in an article entitled, "New Knock-Test Method Could Save Millions in Finding Octane Numbers," by G. A. MacDonald, in "The Oil and Gas Journal" of Jan. 11, 1960, vol. 58, No. 2, the test precision is improved, and a standard deviation of a low fraction of an octane number can be obtained on current commercial gasolines. However, this technique, like the standard ASTM method, is not suited for effective monitoring of a continuous fuel stream.

Accordingly, the present invention is directed toward providing an automated engine which is capable of determining the combustion quality of a fuel, e.g., the octane number of a fuel for spark ignition engines or the cetane number of a fuel for compression ignition engines, without requiring the use of an operator to continually adjust an engine and to carry out the various steps of a process as described above.

The foregoing limitations and deficiencies of the prior art have been overcome, according to the present invention, by providing a testing engine with an automatic regulating system that continuously varies a variable element to control an operating condition of the engine so as to maintain substantially constant a particular aspect of the combustion process of the fuel used to power the engine. Typically, the engine is regulated so that autoignition of the fuel mixture, i.e., detonation in a spark ignition engine fuel mixture or ignition in a compression ignition engine fuel mixture, is established and maintained in accordance with a predetermined standard. By observing the average setting of the variable element and comparing this average setting with the settings produced under similar circumstances using reference fuels to power the engine, the combustion quality of the test fuel can readily be determined.

In one embodiment of the invention the compression ratio of the engine is continually adjusted to cause knocking of the test gasoline, if such is being tested in a spark ignition test engine, or ignition of the test diesel fuel if such is being tested in a compression ignition test engine, to occur during a predetermined interval in each complete engine cycle. Alternatively, for spark ignition engine fuels, the knocking is retained at a relatively fixed magnitude by a continuous adjustment of the compression ratio. The invention also contemplates the provision of means for periodically calibrating the test engine by feeding to it temporarily a reference fuel of known combustion quality.

For a better understanding of the invention reference is made to the following detailed description of a representative embodiment and to the appended drawings in which:

FIG. 1 is a block diagram of a basic system in accordance with the invention for determining the combustion quality of a fuel;

FIG. 3 is a sectional view of a portion of a testing engine in the system of FIG. 2, showing the details of the engine compression ratio adjustment mechanism;

FIG. 4 is a view, partly in section, illustrating a falling level carburetor useful in applications involving the present invention;

FIG. 5 is a typical graph showing cylinder head position versus time for a system such as that shown in FIG. 2;

Figure 2:
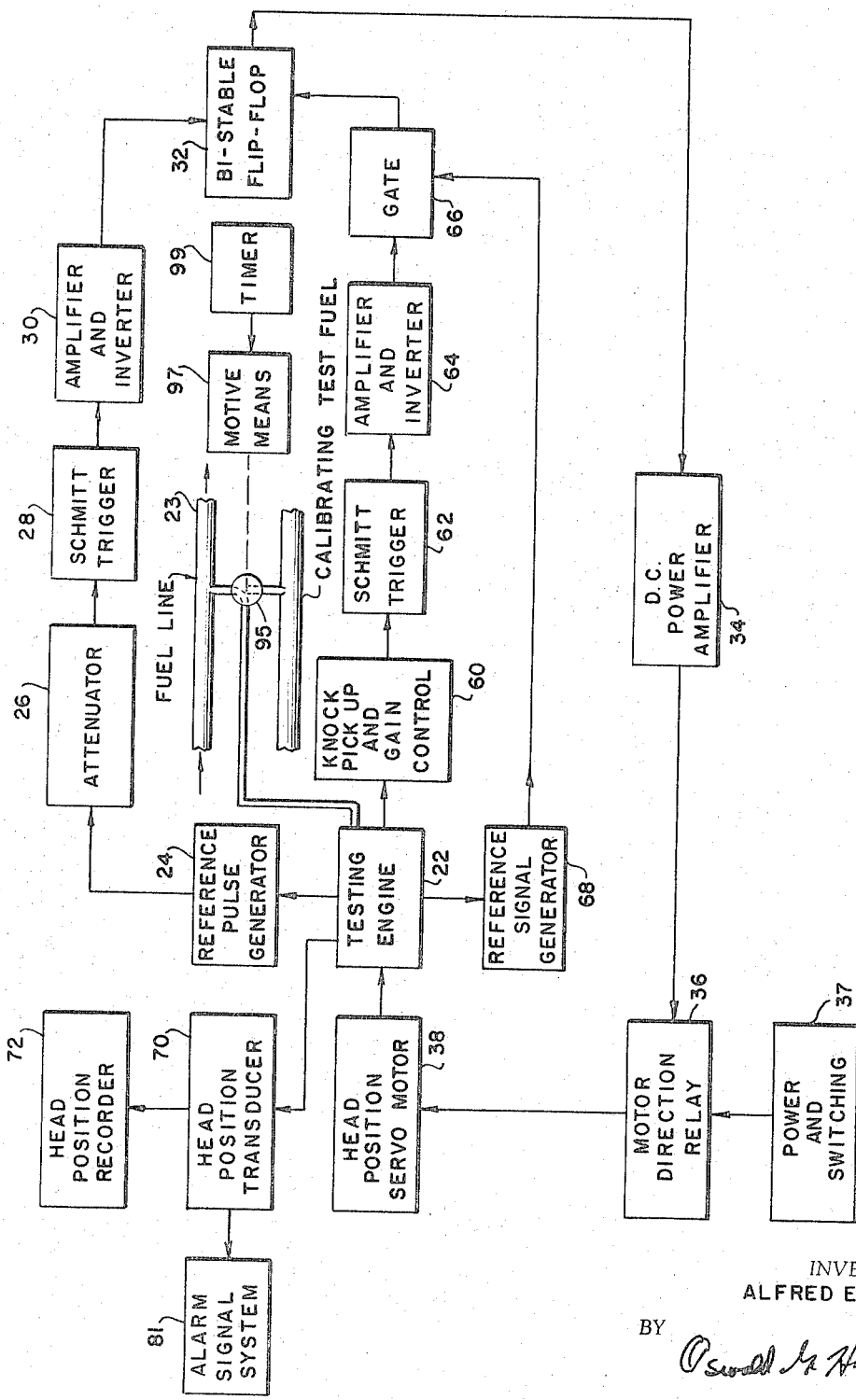
FIG. 2 is a block diagram showing in detail one embodiment in which engine knock for a spark ignition engine is caused to occur during a predetermined interval in an engine cycle.

Referring to FIG. 1, a testing engine 12 is shown that is powered by a test fuel whose combustion quality is to be determined. The engine 12 may be of any suitable type such as the standard ASTM-CFR engine which is commonly used for determining the octane ratings of fuels for spark ignition engines, or it may be the standard ASTM-CFR engine for determining the cetane ratings of diesel fuels for compression ignition engines. The fuel for the engine 12 is derived from a fuel line 13 which may carry a circulating stream of a gasoline blend, for example, the "knock" property of which is to be monitored, or it may carry a diesel fuel whose ignition property is to be monitored.

A combustion process deviation sensor 14 coupled to the testing engine 12 isolates combustion noises from the testing engine, compares them with reference signals, and produces a control signal that is a function of the deviation of a certain aspect of the combustion process from a preestablished standard. This control signal is applied to a combustion process adjuster 16 coupled to the testing engine 12 which varies an element to control a condition in the testing engine 12 upon which the combustion process depends, such as, for example, the compression ratio. Specifically, the combustion process adjuster 16 acts to change the engine operating conditions so that the observed aspect of the combustion process, e.g., detonation of the fuel in the case of a gasoline or ignition of the fuel in the case of a diesel fuel, is in substantial conformity with the preestablished standard. In this fashion the testing engine 12 may be operated so as to maintain a substantially constant knocking in a gasoline, for example, such as knocking during a predetermined fixed interval in the engine cycle or knocking of a substantially constant magnitude.

The combustion process adjuster 16 is also coupled to a transducer 18 which provides a signal representing the changes effected in the testing engine 12 by the adjuster 16 for utilization by a computer (not shown) or for recording by a recorder 20. The data recorded by the recorder 20 may be compared with similar data recorded in the same fashion for one or more reference fuels of known octane or cetane numbers, thereby enabling the combustion quality of the test fuel to be determined quickly and easily.

The signal from the transducer 18 may also be supplied to a signalling device 21 capable of providing an audible or visible signal or warning whenever the combustion quality of the test fuel is outside of specified tolerances. In this fashion undesirable changes in the quality of the test fuel can be detected immediately.

In FIG. 2 is shown a typical system according to the invention for determining fuel detonating quality in which the system operates automatically to regulate the operating conditions of the testing engine so that knock occurs during a specific fixed interval in each complete engine cycle. In this embodiment a testing engine 22 of the spark ignition type indicated above receives test fuel from a fuel line 23. A reference pulse generator 24 coupled to the testing engine 22 generates a reference pulse once during each complete engine cycle. Reference pulses from the generator 24 are applied to an attenuator 26 whose output is coupled to a Schmitt trigger circuit 28 that produces essentially square-shaped output pulses. The pulses from the trigger circuit 28 are applied to an amplifier and inverter 30 whose output signals trigger a bi-stable flip-flop 32.

The output of the bi-stable flip-flop 32, which provides either one of two different signals, is coupled through a D.C. power amplifier 34 to a motor direction relay 36. The relay 36, receiving power from a power and switching network 37, controls a head position servo-motor 38 that is coupled to the testing engine 22.

FIG. 3 shows in detail a typical adjustable cylinder head arrangement 40 that forms part of the testing engine 22. Referring to that figure, a coupling 42 couples the head position servo-motor 38 to a worm gear 46 which causes a threaded ring-shaped structure 48 to rotate about an axis 50. A threaded cylinder wall 52 engages the ring-shaped structure 48 and moves upwardly or downwardly, as the case may be, depending ultimately upon the particular movement of the motor 38. This movement of the cylinder wall 52 decreases or increases the volume in the firing chamber 54 between a piston 56, when the piston is in its top dead center position, and a top portion 58 of the cylinder head, which increases or decreases, respectively, the compression ratio of the testing engine 22.

Referring again to FIG. 2, when the bi-stable flip-flop 32 is triggered by the reference signal from the amplifier and inverter 30 to generate one of its two stable signals, termed here a "first knock change signal," the motor direction relay 36 is energized to cause the head position servo-motor 38 to move, thereby changing the compression ratio in the testing engine 22. As an example only, assume that the reference pulse generator 24 provides a reference signal that occurs once during every complete engine cycle at 13° before the piston 56 of FIG. 3 reaches its top dead center position. Assume further that the first knock change signal generated by the flip-flop 32 in response to the reference signal causes the head position servo-motor 38 to increase the compression ratio. Such an increase causes knocking in the test fuel to occur at an earlier time in a given engine cycle.

Knocking in the testing engine 22 is detected by a knock pickup and gain control device 60. Signals representing the knocking in the engine trigger a Schmitt trigger circuit 62 which transmits relatively square-shaped pulses to an amplifier and inverter 64 whose output is applied to a gate 66. The gate 66 is controlled by signals from a reference signal generator 68 which is coupled to the testing engine 22 and which provides a signal during a predetermined interval in each complete engine cycle. By way of example only, the generator 68 provides a signal to the gate 66 so that the gate is opened for an interval beginning 10° before the piston 56 of FIG. 3 reaches its top dead center position and ending when the piston reaches a position 5° after top dead center.

Thus, knock signals from the amplifier and inverter 64 pass through the gate 66 only during the 15° interval when the piston 56 is between 10° before top dead center and 5° after top dead center. If a knock signal occurs during such an interval it triggers the bi-stable flip-flop 32 to provide the other one of its two stable signals, termed here a "second knock change signal." This second knock change signal passes through the power amplifier 34 and actuates the motor direction relay 36 to change the direction of movement of the head position servo-motor 38. In this fashion, and in the example chosen, the cylinder head 40 of the testing engine 22 is moved to decrease the compression ratio of the engine, thereby causing the knocking to occur later in an engine cycle.

As may be seen, signals from the reference pulse generator 24 occur during each engine cycle at 13° before the top dead center position of the piston and cause the compression ratio of the testing engine to be increased. If no knocking signal is received through the gate 66 during the interval beginning 10° before top dead center and ending 5° after top dead center, the compression ratio continues to increase during the remainder of the engine cycle. On the other hand, if a knock signal is detected during the above-mentioned interval, the head position servo-motor 38 causes the compression ratio to decrease during the remainder of the engine cycle.

Thus, the compression ratio in the testing engine 22 continually increases and decreases due to the above-described action, the cylinder head 40 tending to find a position such that 52½% of the time knocking occurs before 5° after the top dead center position of the piston 56 and 47½% of the time knocking occurs later than 5° after top dead center. This unequal distribution occurs because the signal from the reference pulse generator 24 is of the first signal during each engine cycle and is used to increase the compression ratio of the testing engine. Although the head position servo-motor 38 moves constantly, the engine cylinder head moves slowly and there is sufficient back lash in the gearing 44 so that the cylinder head movement is negligible if a knock signal passes through the gate 66 during every other complete engine cycle. Hence, the unequal distribution does not prevent the cylinder head 40 from reaching a stable position.

Variations in the engine compression ratio are signalled by a head position transducer 70 which generates a signal proportional to the displacement of the cylinder head 40. As best shown in FIG. 3, the transducer 70 may comprise a linear magnetic pickup 71 having a core 73 mounted on a bracket 75 attached to the cylinder head 40 and which is adapted to vary the coupling between a pair of windings 77 and 77a carried by a bracket 79 attached to a fixed part of the engine. With the winding 77 energized by alternating current, a signal will be induced in the winding 77a which will vary as a function of the position of the cylinder head 40 and therefore with the engine compression ratio.

As shown in FIG. 2, the signal from the transducer 70 is applied to a head position recorder 72 which records changes in the position of the cylinder head 40. The recorded positions may be averaged to produce an average reading which then may be compared with similar readings obtained for reference fuels of known detonating properties. If the detonating qualities of the reference fuels differ only slightly from the detonating quality of the test fuel and bracket the latter, it will be understood that the detonation quality of the test fuel may readily be determined by interpolation.

Signals from the head position transducer 70 are also applied to a conventional alarm signal system 81 which is adapted to provide a visible or audible signal whenever the cylinder head 40 passes a predetermined position or is outside of a specified operating range. In this manner the detonating quality of the test fuel can be continuously monitored, and a warning signal given whenever the quality is too low or too high.

As is well known, it is essential in fuel detonation quality tests made by an engine of the type deescribed above, that the fuel-air ratio be maintained at a predetermined optimum value. The optimum value for fuels of different specified gravity is not constant, depending upon the carbon-hydrogen ratio of the fuel. Gasolines of low specific gravity have a higher hydrogen content and require a larger quantity of air for their complete combustion. Fuels containing a percentage of alcohol which has some oxygen in the molecule also require less air than pure hydrocarbons of the same specific gravity. Therefore, it is desirable to provide means for automatically adjusting the fuel-air ratio to the optimum value. This may be accomplished by the falling level carburetor shown in FIG. 4.

Referring to FIG. 4, the carburetor 74 comprises a float chamber 76 inside of which is positioned a float 78. An arm 80, which pivots freely about a pivot pin 82, is attached to the float 78. A needle 84, forming part of a needle valve arrangement 86, rests upon the arm 80. When the float 78 is in a downward position, the needle 84 opens the valve 86 and fuel is allowed to enter the float chamber 76 through an intake passage 88. When the float 78 is in its upward position however, the needle 84 closes the valve 86 and no fuel is allowed to enter the float chamber 76.

A solenoid 90 is mounted on a plate 92 in the float chamber 76, and has a pole piece 94 which is soldered or attached in any other similar fashion to the float 78. The solenoid is electrically connected by a pair of leads 96 to a timer 98 which supplies power to the solenoid for operating the pole piece 94. When the solenoid 90 is energized, the pole piece 94 is pulled to an upward position, thereby drawing the float 78 after it and closing the valve 86, permitting no fuel to enter the float chamber 76. When the solenoid is de-energized, however, under the action of the timer 98, the pole piece 94 drops to a downward position, thereby opening the valve 86 and permitting fuel to enter the fuel chamber 76.

The action of the timer 98 is periodic and, for example, may involve a one minute timing cycle. To elaborate, the timer may energize the solenoid 90 for 55 seconds, preventing fuel from entering the chamber 76 and allowing the fuel within the chamber to drop to a lower level as the fuel is used in the testing engine. The timer then de-energizes the solenoid 90 for 5 seconds, thus allowing fuel to enter the chamber 76 and to assume a predetermined upper level. Thereafter, the timer energizes the solenoid 90 and the cycle repeats.

The upper and lower fuel levels are chosen so that they define a range that provides good combustion and which includes the fuel level corresponding to the optimum fuel-air ratio for any given engine operation. Further, the timing cycle, chosen as one minute in the example, is made slow enough and the change in fuel level is made small enough so as not to affect adversely the operation of the testing engine.

Desirably, the testing engine 22 should be run periodically on a test fuel of known detonating quality for calibration purposes. To this end, calibrating test fuel may be supplied as one input to a two-way valve 95 which also controls the flow of the test fuel from the fuel line 23 to the engine 22. The valve is controlled by motive means 97 adapted to be energized periodically by a timer 99. The timer 99 may be designed to operate the valve 95 say at hourly intervals to interrupt the flow of test fuel to the engine 22 and to supply calibration fuel thereto for a long enough time to provide readings on the head position recorder 72 representative of the engine head displacement produced with the calibration fuel. If successive readings for the calibrating fuel are substantially the same, the operator will know that the calibration of the equipment has not changed.

In operation, the system shown in FIG. 2 may first be calibrated by running the engine 22 on several calibrating fuels of known detonating qualities that bracket and differ only slightly from the detonating quality of the test fuel and noting the readings of the head position recorder 72. The engine 22 is then run on the test fuel and the detonating quality of the latter determined by interpolation using the previously determined readings for the calibrating fuel.

The system will continue to run on the test fuel without change, except for the hourly calibrations made with one of the calibrating fuels used in the initial calibration. By observing the successive calibration readings any change in calibration of the system can readily be detected, whereupon the system can be recalibrated or other appropriate corrective action taken. In the event the detonating quality of the test fuel goes either above or below the quality specified, the signal alarm 81 (FIG. 2) will be operated, giving prompt warning to the operator that conditions in the system supplying the test fuel should be modified to bring the detonating quality within specifications.

FIG. 5 is a curve showing cylinder head position versus time for a testing engine having a variably positioned head and employing the falling level carburetor 74 of FIG. 4. In the figure, which is drawn at much less than full scale, the optimum fuel-air ratio points are indicated by the peaks of the curve. These may be easily averaged to determine an average cylinder head position for the optimum fuel-air ratio.

Figure 6:
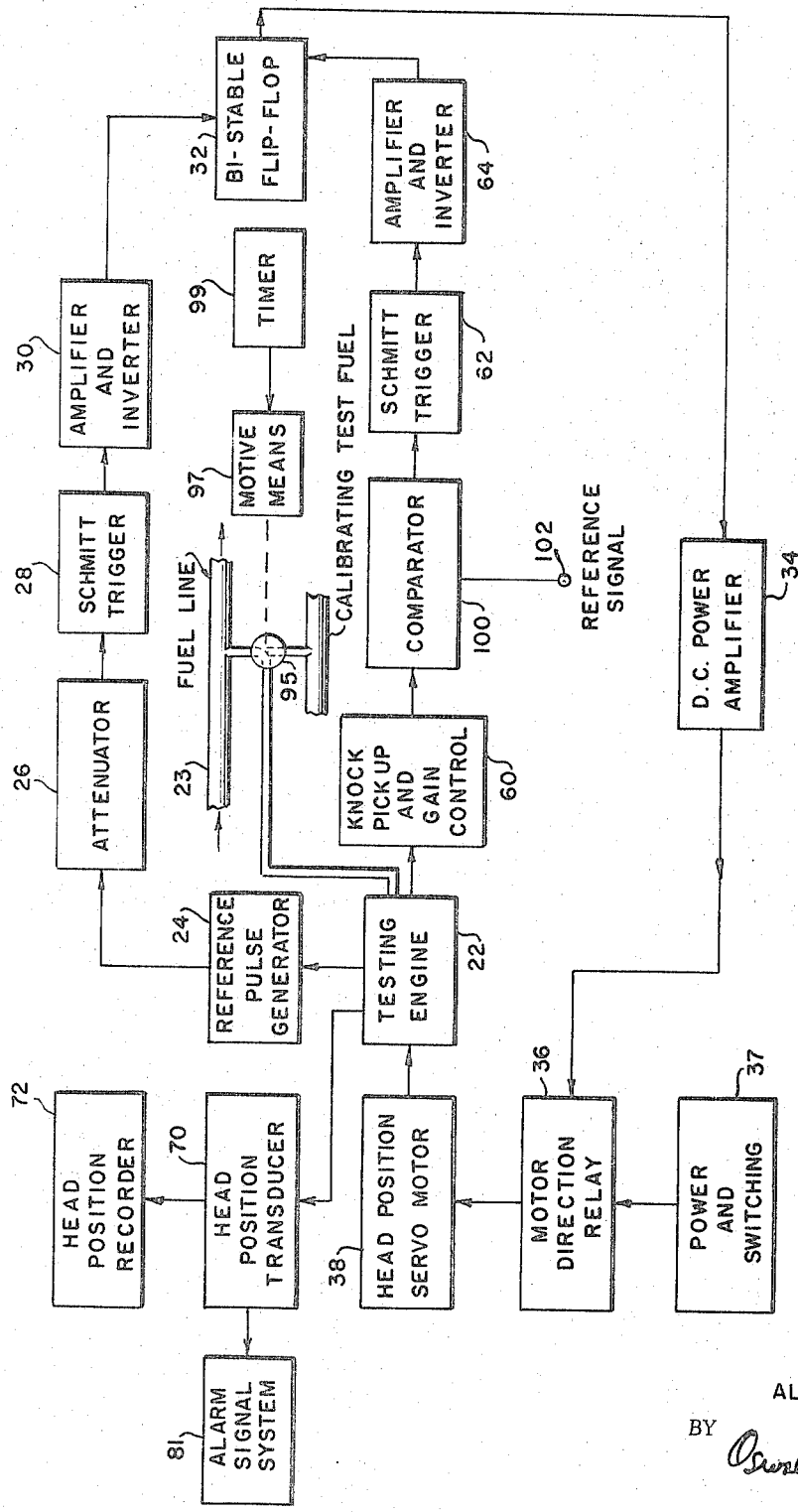
FIG. 6 is a detailed block diagram of another embodiment of the invention in which a constant knock intensity for a spark ignition engine fuel is maintained.

In FIG. 6 is shown a system very similar to that of FIG. 2, but with appropriate modifications to retain the knocking of the test fuel in the testing engine at a predetermined magnitude. In FIG. 6, the same reference characters have been used as in FIG. 2 to designate like components. As may be seen the reference signal generator 68 and the gate 66 of FIG. 2 have been eliminated and a comparator 100 has been added.

Referring specifically to FIG. 6, the comparator 100 receives a knock signal from the knock pickup and gain control 60 and compares the signal with a fixed standard reference signal applied to a terminal 102 coupled to the comparator. This reference signal is representative of a standard knock intensity at which it is desired to retain the knocking in the engine. The comparator 100 emits a ignal to trigger the Schmitt trigger circuit 62 if the knock ignal received from the pickup 60 is greater than the eference signal applied to the terminal 102. If such is he case, the Schmitt trigger circuit and its associated amlifier and inverter 64 trigger the bi-stable flip-flop 32 to enerate the second knock change signal.

As described above, the second knock change signal controls the motor direction relay 36 so that the compression ratio in the testing engine 22 is decreased. This lowers the intensity of the knocking of the fuel in the engine. As also explained previously, however, periodic signals from the reference pulse generator 24 are used to rigger the bi-stable flip-flop 32 to generate during each engine cycle a first knock change signal which increases he compression ratio and increases the knocking intensity.

Because of the above-described action, the knocking assumes a stable magnitude equal to the magnitude of the reference signal applied to the terminal 102 of the comparator 100. As with the system of FIG. 2, the system of FIG. 6 is a no-null system. That is, the head position servo-motor 38 continuously rotates in one direction or the other. However, because of back lash in the gearing between the motor 38 and the testing engine 22, the cylinder head of the engine does achieve a stable position to provide a relatively constant knock magnitude in the engine.

The relatively fixed head position assumed by the testing engine to achieve a constant magnitude knocking signal is translated by the head position transducer 70 into a signal that is applied to the recorder 72 and to the signal system 81, as in the system shown in FIG. 2.

Figure 7:
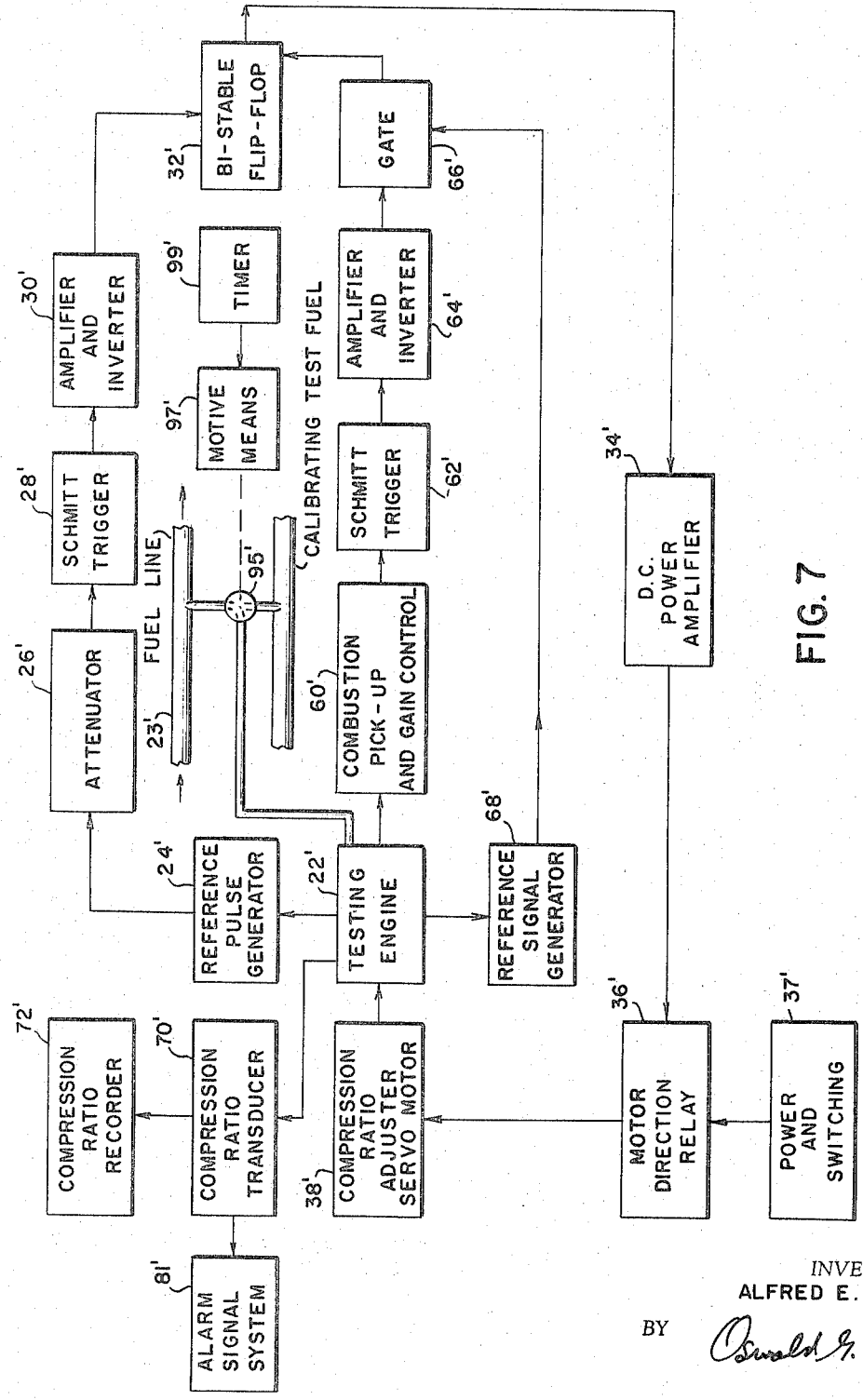
FIG. 7 is a block diagram of a system similar to that of FIG. 2 used to determined the ignition quality of a compression ignition engine fuel.

FIG. 7 shows a system similar to that of FIG. 2 which is used to determine the cetane number of a fuel for compression ignition engines. In the figure, reference characters similar to those used in FIG. 2 are employed to designate similar components.

Referring to FIG. 7, a testing engine 22′, such as the standard ASTM-CFR compression ignition testing engine, receives a compression ignition engine fuel from a fuel line 23′ through the valve 95′. Signals representative of the combustion process of the fuel in the engine, and, particularly, representative of ignition of the fuel, are generated by a combustion pickup and gain control 60′. These signals are applied to a Schmitt trigger 62′ which generates a relatively square shaped pulse corresponding in time to the ignition of the fuel in the testing engine 22′. This pulse is applied to an amplifier and inverter 64′ and thence to a gate 66′.

The gate 66′ is controlled by a signal from a reference signal generator 68′ which is coupled to the testing engine 22′ and which provides a signal during a predetermined interval in each complete engine cycle. By way of example only, the generator 68′ provides a signal to the gate 66′ so that the gate is opened for an interval beginning 10° before the piston (not shown) of the testing engine 22′ reaches its top dead center position and ending when the piston reaches the top dead center position. Thus, ignition signals from the amplifier and inverter 64′ pass through the gate 66′ only if they occur during this 10° interval. The gate 66′ is set to close at the top dead center position of the piston, instead of 5° after top dead center as in the case of the octane engine of FIG. 2, because the ASTM testing procedure for diesel fuels calls for ignition to occur at this top dead center position.

A reference signal is generated by a reference pulse generator 24′ once during each engine cycle, for example, at 13° before the top dead center position of the piston of the testing engine 22′. This signal is employed as in the system of FIG. 2 to trigger a bi-stable flip-flop 32′ to generate what is termed herein "a first ignition change signal." Similarly, ignition signals passing through the gate 66′ during the above 10° interval trigger the bi-stable flip-flop 32′ to generate "a second ignition change signal."

These first and second signals are applied through a D.C. power amplifier 34′ to actuate a motor direction relay 36′ that controls a compression ratio adjuster servo-motor 38′ to increase and decrease, respectively, the compression ratio of the testing engine 22′. The specific details of the compression ratio adjuster servo-motor 38′ and its coupling to the testing engine 22′ are not shown here, but they are similar to the arrangement shown in FIG. 3, with the exception that the servo-motor 38′ varies the compression ratio in the standard ASTM-CFR cetane number engine by moving a piston plug axially in the firing chamber.

In this fashion, similarly to the system of FIG. 2, the compression ratio of the testing engine 22′ is continually increased and decreased so that 52½% of the time ignition occurs before the top dead center position of the piston in the testing engine and 47½% of the time ignition occurs later than the top dead center position. Although there is this unequal distribution, the compression ratio in the testing engine nonetheless achieves a stable value because of backlash in the coupling between the compression ratio adjuster servo-motor 38′ and the testing engine 22′.

The relatively fixed compression ratio of the testing engine 22′ for the particular fuel under test is translated by a compression ratio transducer 70′, similar to the transducer 70 of FIG. 3, into a signal that is applied to a compression ratio recorder 72′ and an alarm signal system 81′. Data in the recorder 72′ for the test fuel is compared with similarly recorded data for reference fuels, and the cetane number is determined thereby. The alarm signal system, of course, provides an alarm signal if the cetane number of the test fuel, as represented by the compression ratio in the testing engine 22′, deviates by more than a predetermined amount from a preestablished standard.

The several embodiments of automated engine systems that have been described above enable the combustion quality of a test fuel to be determined much more quickly and accurately than has been possible heretofore. As set forth herein, such engine systems may be coupled directly to a stream of fuel in a refinery operation, for example, and may be used to sample the fuel continuously and to determine its combustion quality. As a result, the cost of producing fuel of specified quality can be materially reduced.

Although in the embodiment shown in FIG. 2, for example, the compression ratio of the testing engine 22 is varied to change the knocking of the test fuel, other elements in the engine could be changed to achieve the same effect. Thus, the ignition timing could be changed to provide such a variable, or the temperature in the water jacket 45 surrounding the firing chamber 54 of the testing engine could be changed to provide a varying knock for any test fuel. Further, inlet air temperature could be varied, as well as the fuel-air ratio. All of these arrangements are effective, since all achieve the desired change in the knocking of the fuel in the testing engine.

From the description of the invention above, it is apparent that modifications of the embodiments described may be made which will fall within the true scope of the invention. Therefore, the invention should not be deemed limited except as it is defined by the following claims.

I claim:

1. In apparatus for determining the detonating quality of a test fuel in a test engine having a repetitive operating cycle and means for adjusting the compression ratio of said engine to control the tendency of said fuel to detonate in said engine, the combination of bistable flip-flop means, means for supplying a reference signal in timed relation to said engine cycle to said flip-flop means to condition it to a first stable state, means responsive to detonation of predetermined character in said engine for supplying a detonation signal to said flip-flop means to condition it to a second stable state, means responsive to said flip-flop means in said first and second stable states, respectively, for adjusting said compression ratio adjusting means to increase and decrease the engine compression ratio, and means providing indications of the adjustment of said compression ratio adjusting means.

2. Apparatus as defined in claim 1 in which the detonating signal generating means comprises signal pickup means responsive to detonation in said engine, gate means interposed between said signal pickup means and said flip-flop means, and means operated in timed relation with said engine for supplying a gating signal to said gate means to render the same effective to supply the output of said pickup means to said flip-flop means only during a predetermined portion of said engine cycle.

3. Apparatus as defined in claim 1 in which the detonating signal generating means comprises signal pickup means responsive to detonation in said engine, means for generating a reference signal representing a predetermined engine detonation intensity, and means jointly responsive to the output of said signal pickup means and to said reference signal for supplying an actuating signal to said flip-flop means.

4. In a single-cylinder test engine for conducting a test of the combustion quality of a sample motor fuel by comparison with a reference motor fuel of known combustion quality, the engine performing no useful work, operating under detonation conditions throughout a significant portion of the duration of a test, and having a repetitive operating cycle and engine compresison ratio adjusting means for controlling the combustion process of the fuel in the engine,
the combination of reversible motive means for actuating said compression ratio means to vary compression ratio,
means for generating a signal representative of detonation in said engine,
means responsive to a function of said signal for controlling said motive means to effect adjustment of the compression ratio adjusting means to maintain substantially a predetermined condition of at least one of autoignition time lag and autoignition intensity for both said sample motor fuel and said reference motor fuel,
whereby the position of said engine compression ratio adjusting means for said sample motor fuel is a function of the detonation propensity of said motor fuel, and
means responsive to adjustment of the compression ratio adjusting means to provide a signal which is a function of said adjustment.

5. In a single-cylinder test engine for conducting a test of the detonation propensity of a sample gasoline by comparison with a reference gasoline, the engine performing no useful work, operating under detonation conditions throughout a significant portion of the duration of the test, and having a repetitive operating cycle and engine compression ratio adjusting means for controlling the combustion process of the fuel in the engine,
the combination of reversible motive means for actuating said compression ratio means to vary compression ratio,
means for generating a signal representative of detonation in the engine,
means responsive to a function of said signal for controlling said motive means to effect adjustment of the compression ratio adjusting means to maintain substantially a predetermined condition of at least one of detonation time lag and detonation intensity for both said sample and reference gasolines,
whereby the position of said engine compression ratio adjusting means for said sample gasoline is a function of the detonation propensity of said sample, and
means responsive to adjustment of the compression ratio adjusting means to provide a signal which is a function of the adjustment of the compression ratio adjusting means.

6. In a single-cylinder test engine for conducting a test of the detonation propensity of a sample gasoline by comparison with a reference gasoline, the engine performing no useful work, operating under detonation conditions throughout a significant portion of the duration of the test, and having a repetitive operating cycle and engine compression ratio adjusting means for controlling the combustion process of the fuel in the engine,
the combination of reversible motive means for actuating said compression ratio means to vary compression ratio,
means for generating a signal representative of detonation in the engine,
means for generating a reference detonation signal representative of a reference detonation,
means jointly responsive to the reference detonation signal and to the detonation signal for controlling said motive means to effect adjustment of the compression ratio adjusting means to maintain substantially a predetermined condition of at least one of detonation time lag and detonation intensity for both said sample and reference gasolines,
whereby the position of said engine compression ratio adjusting means for said sample gasoline is a function of the detonation propensity of said sample, and
means responsive to adjustment of the compression ratio adjusting means to provide a signal which is a function of the adjustment of the compression ratio adjusting means.

7. In a single-cylinder test engine for conducting a test of the combustion quality of a sample motor fuel by comparison with a reference motor fuel of known combustion quality, the engine performing no useful work, operating under detonation conditions throughout a significant portion of the duration of a test, and having a repetitive operating cycle and engine compresison ratio adjusting means for controlling the combustion process of the fuel in the engine,
the combination of reversible motive means for actuating said compression ratio means to vary compression ratio,
means for generating a signal representative of detonation in said engine,
means responsive to a function of said signal for controlling said motive means to effect adjustment of the compression ratio adjusting means to maintain substantially a predetermined condition of at least one of autoignition time lag and autoignition intensity for both said sample motor fuel and said reference motor fuel,
whereby the position of said engine compression ratio adjusting means for said sample motor fuel is a function of the detonation propensity of said motor fuel,
means responsive to the adjustment of the compression ratio adjusting means to provide a signal which is a function of said adjustment, and
signal alarm means responsive to a predetermined degree of adjustment of the adjusting means.

8. In a single-cylinder test engine for conducting a test of the detonation propensity of a sample gasoline by comparison with a reference gasoline, the engine performing no useful work, operating under detonation conditions throughout a significant portion of the duration of the test and having a repetitive operating cycle and engine compression ratio adjusting means for controlling the combustion process of the fuel in the engine,
the combination of reversible motive means for actuating said compression ratio means to vary compression ratio,
means for generating a signal representative of detonation in the engine, means responsive to a function of said signal for controlling said motive means to effect adjustment of the compression ratio adjusting means to maintain substantially a predetermined condition of at least one of detonation time lag and detonation intensity for both sample and reference gasolines, whereby the position of said engine compression ratio adjusting means for said sample gasoline is a function of the detonation propensity of said sample, means responsive to adjustment of the compression ratio adjusting means to provide a signal which is a function of the adjustment of the compression ratio adjusting means, and automatic means for periodically interrupting the supply of the test fuel to the engine and substituting therefor a reference fuel of known detonating quality.

9. In a single-cylinder test engine for conducting a test of the detonation propensity of a sample gasoline by comparison with a reference gasoline, the engine performing no useful work, operating under detonation conditions throughout a significant portion of the duration of the test, and having a repetitive operating cycle and engine compression ratio adjusting means for controlling the combustion process of the fuel in the engine, the combination of reversible motive means for actuating said compression ratio means to vary compression ratio, means for generating a signal representative of detonation in the engine, means responsive to a function of said signal for controlling said motive means to effect adjustment of the compression ratio adjusting means to maintain substantially a predetermined condition of at least one of detonation time lag and detonation intensity for both said sample and reference gasolines, whereby the position of said engine compression ratio adjusting means for said sample gasoline is a function of the detonation propensity of said sample, means responsive to adjustment of the compression ratio adjusting means to provide a signal which is a function of the adjustment of the compression ratio adjusting means, and means for automatically adjusting the fuel-air ratio of said engine concurrently with the adjustment of said compression ratio adjusting means.

10. In a single-cylinder test engine for conducting a test of the detonation propensity of a sample gasoline by comparison with a reference gasoline, the engine performing no useful work, operating under detonation conditions throughout a significant portion of the duration of the test, and having a repetitive operating cycle and engine compression ratio adjusting means for controlling the combustion process of the fuel in the engine, the combination of reversible motive means for actuating said compression ratio means to vary compression ratio, means for generating a signal representative of detonation in the engine, means responsive to a function of said signal for controlling said motive means to effect adjustment of the compression ratio adjusting means to maintain substantially a predetermined condition of at least one of detonation time lag and detonation intensity for both said sample and reference gasolines, whereby the position of said engine compression ratio adjusting means for said sample gasoline is a function of the detonation propensity of said sample, means responsive to adjustment of the compression ratio adjusting means to provide a signal which is a function of the adjustment of the compression ratio adjusting means, and means for periodically varying between two limits the proportion of fuel in the combustible mixture fed to the engine, the two limits defining a range of fuel proportions including an optimum fuel proportion for operation of said engine.

11. In a single-cylinder test engine for conducting a test of the detonation propensity of a sample gasoline by comparison with a reference gasoline, the engine performing no useful work, operating under detonation conditions throughout a significant portion of the duration of the test, and having a repetitive operating cycle and engine compression ratio adjusting means for controlling the combustion process of the fuel in the engine, the combination of reversible motive means for actuating said compression ratio means to vary compression ratio, means for generating a signal representative of detonation in the engine, means responsive to a function of said signal for controlling said motive means to effect adjustment of the compression ratio adjusting means to maintain substantially a predetermined condition of at least one of detonation time lag and detonation intensity for both said sample and reference gasolines, whereby the position of said engine compression ratio adjusting means for said sample gasoline is a function of the detonation propensity of said sample, means responsive to adjustment of the compression ratio adjusting means to provide a signal which is a function of the adjustment of the compression ratio adjusting means, carburetor means connected to receive motor fuel and to supply a combustible mixture of fuel and air to said engine, and means for periodically adjusting the fuel level in said carburetor means to a predetermined level and allowing said level to fall to a lower level as the result of the consumption of fuel by said engine, said predetermined level and said lower level establishing limits of a range of fuel air ratios including an optimum fuel-air ratio for said engine.

12. In a single-cylinder test engine for conducting a test of the detonation propensity of a sample gasoline by comparison with a reference gasoline of known detonation propensity, the engine performing no useful work, operating under detonation conditions throughout a significant portion of the duration of the test, and having a repetitive operating cycle and engine compression ratio adjusting means for controlling the combustion process of the fuel in the engine, the combination of reversible motive means for actuating said compression ratio adjusting means, means for generating a signal representative of detonation in the engine, control means normally operative in one position for controlling said motive means to actuate said compression ratio adjusting means to increase compression ratio, and intermittently rendered operative in another position in response to a function of said signal for controlling said compression ratio adjusting means to decrease compression ratio, thereby to maintain substantially a predetermined condition of at least one of detonation time lag and detonation intensity for both said sample and said reference gasolines, whereby the position of said engine compression ratio adjusting means for said sample gasoline is a function of the detonation propensity of said sample, and means responsive to adjustment of the compression ratio adjusting means to provide a signal which is a function of the adjustment of the compression ratio adjusting means.

(References on following page)

References Cited by the Examiner

UNITED STATES PATENTS

| | | | |
|---|---|---|---|
| 1,941,342 | 12/1933 | Dyer | 123—48 |
| 2,145,017 | 1/1939 | Tsuneda | 123—48 |
| 2,337,522 | 12/1943 | Eldredge | 73—35 |
| 2,395,902 | 3/1946 | Nicewanger et al. | 73—35 |
| 2,403,774 | 7/1946 | Whitty et al. | 73—35 X |
| 2,220,558 | 11/1946 | Van Dijck et al. | 123—198 |
| 2,450,882 | 10/1948 | Costa | 73—115 |
| 2,670,724 | 3/1954 | Reggio | 123—25.5 |
| 2,679,746 | 6/1954 | DeBoisblanc | 73—35 |
| 2,789,269 | 4/1957 | DeBoisblanc | 73—35 X |

OTHER REFERENCES

ASTM Manual for Rating Motor Fuels by Motor and Research Methods, 4th edition, 1960, Research Method D–908, pages 17–29, and page 84.

"New Data on Automotive Combustion," National Bureau of Standards Technical News Bulletin, vol. 37, No. 8, August 1953, pages 113, 114, 115.

References Cited by the Applicant

UNITED STATES PATENTS

| | | |
|---|---|---|
| 2,881,235 | 4/1959 | Van Pool. |
| 3,000,812 | 9/1961 | Boyd. |
| 3,238,765 | 3/1966 | Beal. |

OTHER REFERENCES

"Automation for Gas Blending" by H. H. Sisk from "The Oil and Gas Journal" of June 20, 1960, pages 108–111.

"Automatic Blending Lives Up to Goal" by B. B. Butler from "Petroleum Refiner" of August 1960, pages 97–100.

"Octane Numbers in Less Time" by H. W. Kellogg in "The Oil and Gas Journal" of June 20, 1965, pages 89–90.

RICHARD C. QUEISSER, *Primary Examiner.*

ERNEST F. KARLSEN, EDWARD P. FORGRAVE, *Assistant Examiners.*